(12) United States Patent
Doremaele et al.

(10) Patent No.: US 9,315,594 B2
(45) Date of Patent: *Apr. 19, 2016

(54) TITANIUM-CATALYST SYSTEM COMPRISING SUBSTITUTED CYCLOPENTADIENYL, GUANIDINE AND DIENE LIGANDS

(75) Inventors: Van Gerardus Henricus Josephus Doremaele, Sittard (NL); Martin Alexander Zuideveld, Maastricht (NL); Victor Fidel Quiroga Norambuena, Lanaken (BE); Philip Mountford, Oxford (GB); Richard Scott, Gala Shiels (GB)

(73) Assignee: LANXESS Elastomers B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/008,853

(22) PCT Filed: Mar. 29, 2012

(86) PCT No.: PCT/EP2012/055584
§ 371 (c)(1),
(2), (4) Date: May 21, 2014

(87) PCT Pub. No.: WO2012/130921
PCT Pub. Date: Oct. 4, 2012

(65) Prior Publication Data
US 2014/0296458 A1   Oct. 2, 2014

(30) Foreign Application Priority Data
Apr. 1, 2011 (EP) .................... 11160804

(51) Int. Cl.
| | | |
|---|---|---|
| C08F 4/6592 | (2006.01) | |
| C08F 4/642 | (2006.01) | |
| C08F 4/643 | (2006.01) | |
| C08F 210/16 | (2006.01) | |
| C08F 4/76 | (2006.01) | |
| C08F 10/02 | (2006.01) | |
| C08F 4/52 | (2006.01) | |
| B01J 31/14 | (2006.01) | |
| B01J 31/16 | (2006.01) | |
| B01J 31/18 | (2006.01) | |
| B01J 31/22 | (2006.01) | |
| C08F 4/659 | (2006.01) | |

(52) U.S. Cl.
CPC ... *C08F 4/76* (2013.01); *C08F 4/52* (2013.01); *C08F 4/6592* (2013.01); *C08F 10/02* (2013.01); *B01J 31/14* (2013.01); *B01J 31/146* (2013.01); *B01J 31/1608* (2013.01); *B01J 31/1805* (2013.01); *B01J 31/1825* (2013.01); *B01J 31/2291* (2013.01); *B01J 31/2295* (2013.01); *B01J 2531/46* (2013.01); *C08F 4/65908* (2013.01); *C08F 4/65912* (2013.01); *C08F 210/16* (2013.01); *C08F 2420/03* (2013.01); *Y02P 20/52* (2015.11)

(58) Field of Classification Search
CPC ............. C08F 4/64013; C08F 4/65908; C08F 4/6592; C08F 210/16; C08F 4/65912
See application file for complete search history.

(56) References Cited

U.S. PATENT DOCUMENTS

| 5,646,084 A | 7/1997 | Patton et al. |
| 6,420,300 B1 | 7/2002 | McKeeking et al. |

(Continued)

FOREIGN PATENT DOCUMENTS

| SG | 193639 A1 | 11/2013 |
| WO | WO 2011/054927 | * 5/2011 |

OTHER PUBLICATIONS

Henderson, Kenneth, et al., "Synthesis of zirconocene amides and ketimides and an investigation into their ethylene polymerization activity", Journal of Organometallic Chemistry, 656 (2002), Elsevier Science B.V., Amsterdam, The Netherlands, pp. 63-70.

(Continued)

*Primary Examiner* — Caixia Lu

(57) ABSTRACT

The invention relates to a catalyst system for the polymerization of olefins comprising a metal complex of formula CyLMD and an activating cocatalyst, wherein M is titanium, Cy is a cyclopentadienyl-type ligand, D is a diene, L is a guanidinate-containing ligand of the formula (I) wherein each A is independently selected from nitrogen or phosphorous and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals, and Cy is a mono- or polysubstituted cyclopentadienyl-type ligand, wherein the one or more substituents of Cy are selected from the group consisting of halogen, hydrocarbyl, silyl and germyl residues, optionally substituted with one or more halogen, amido, phosphido, alkoxy, or aryloxy residues. The invention further relates to a process for the preparation of a polymer comprising at least one aliphatic or aromatic hydrocarbyl $C_{2-20}$ olefin wherein the at least one aliphatic or aromatic olefin is contacted with the catalyst system of the present invention.

(I)

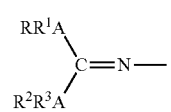

12 Claims, No Drawings

(56) References Cited

U.S. PATENT DOCUMENTS

| | | | |
|---|---|---|---|
| 6,528,671 | B1 | 3/2003 | Nabika |
| 8,987,393 | B2 * | 3/2015 | Van Doremaele et al. ... 526/161 |
| 2007/0105709 | A1 * | 5/2007 | Carnahan et al. ............ 502/120 |
| 2013/0066028 | A1 | 3/2013 | Van Doremaele et al. |
| 2014/0249283 | A1 | 9/2014 | Doremaele et al. |

OTHER PUBLICATIONS

Yasuda, H., et al., "1, 3-Diene Complexes of Zirconium and Hafnium Prepared by the reaction of Enedlylmagnesium . . . ", Organometallics 1982, 1, 1982 American Chemical Society, Washington, DC, USA, pp. 388-396.

Yasuda, Hajime, et al., "Unique Chemical Behavior and Bonding of Early-Transition-Metal-Diene Complexes", Acc. Chem. Res. 1985, 18, American Chemical Society, Washington, DC, USA, pp. 120-126.

Erker, Gerhard, et al., "The Remarkable Features of (h4-Conjugated Diene zirconocene and-hafnocene Complexes", Advances in Organometallic Chemistry, 1985, 24, , obtained from the Internet at http://www.sciencedirect.com/science/article/pii/S0065305508604128, Elsevier, Amsterdam, The Netherlands, Summary only.

Kretschmer, Winfried P., et al., "The titanium complex . . . ", Chem. Commun., 2002, The Royal Society of Chemistry, London, United Kingdom, pp. 608-609.

Chen, Eugene You-Xian, et al., "Cocatalysts for Metal-Catalyzed Olefin Polymerization: Activators, Activation Processes, and Structure-Activity Relationships", Chem. Rev., 2000, 100 (4), American Chemical Society pp. 1391-1434.

European Search Report from co-pending European application No. EP11160804, dated Sep. 9, 2011, 2 pages.

* cited by examiner

TITANIUM-CATALYST SYSTEM COMPRISING SUBSTITUTED CYCLOPENTADIENYL, GUANIDINE AND DIENE LIGANDS

The invention relates to a new catalyst system for the polymerization of olefins comprising a metal complex of formula CyLMD and an activating cocatalyst, wherein
M is titanium,
Cy is a cyclopentadienyl-type ligand,
L is an imine ligand,
D is a diene.

The invention also relates to a process for the preparation of a polymer comprising at least one aliphatic or aromatic hydrocarbyl $C_{2-20}$ olefin.

Such metal complex and process are known from U.S. Pat. No. 6,528,671 B1. U.S. Pat. No. 6,528,671 B1 relates to a transition metal compound suitable as an addition polymerization catalyst and process for the preparation of copolymer of ethylene and 1-hexene in the presence of a catalyst which is an organometallic complex of a group 4 metal, the organometallic complex containing a phosphinimine ligand.

A disadvantage of the process described in U.S. Pat. No. 6,528,671 B1 is the relatively low activity of the organometallic complex containing the phosphinimide ligand. From Henderson et al. "Synthesis of zirconocene amides and ketimides and an investigation into their ethylene polymerization activity", J. of Organometallic chemistry; Vol. 656, no 1-2, 2002, pages 63-70 organometallic complexes based on zirconium also show relatively low catalyst activity.

The aim of the invention is to provide a new class of catalyst systems comprising imine-type ligands providing highly active catalyst systems for the polymerization of olefins.

This objective is reached by a catalyst system comprising a metal complex of formula CyLMD wherein
L is a guanidinate ligand of the formula

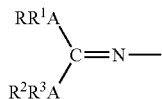

wherein each A is independently selected from nitrogen or phosphorous and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals and Cy is a mono- or polysubstituted cyclopentadienyl-type ligand, wherein the one
or more substituents of Cy are selected from the group consisting of halogen, hydrocarbyl, silyl and germyl residues, optionally substituted
with one or more halogen, amido, phosphido, alkoxy, or aryloxy residues.

Surprisingly with the catalyst system according to the invention, highly active catalyst systems for the polymerization of olefins are obtained. Another advantage of the catalyst system according to the present invention is its instantaneous catalyst activity upon combination with the activating cocatalyst.

DETAILS OF THE INVENTION

The invention relates to a catalyst system for the polymerization of olefins comprising a metal complex of formula CyLMD and an activating cocatalyst, wherein
M is titanium,
Cy is a cyclopentadienyl-type ligand,
D is a diene,
L is a guanidinate ligand of the formula

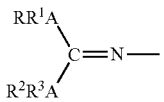

wherein each A is independently selected from nitrogen or phosphorous and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals and
Cy is a mono- or polysubstituted cyclopentadienyl-type ligand,
wherein the one or more substituents of Cy are selected from the group consisting of halogen, hydrocarbyl, silyl and germyl residues, optionally substituted with one or more halogen, amido, phosphido, alkoxy, or aryloxy residues.

As used herein, the term substituted cyclopentadienyl-type ligand is meant to broadly convey its conventional meaning, namely a substituted ligand having a five-membered carbon ring, which is bonded to the metal via a π-type bonding. Thus, the term cyclopentadienyl-type includes cyclopentadienyl, indenyl and fluorenyl. The term mono- or polysubstituted refers to the fact that one or more aromatic hydrogen atoms of the cyclopentadienyl structure have been replaced by one or more other residues. The number of substituents is between 1 and 5 for the cyclopentadienyl ligand, 1 to 7 for the indenyl ligand and 1 to 9 for the fluorenyl ligand. An exemplary list of substituents for a cyclopentadienyl ligand includes the group consisting of $C_{1-10}$ hydrocarbyl radical (which hydrocarbyl substituents are unsubstituted or further substituted), a halogen atom, $C_{1-8}$ alkoxy radical, $C_{6-10}$ aryl or aryloxy radical; an amido radical which is unsubstituted or substituted by up to two $C_{1-8}$ alkyl radicals, a phosphido radical which is unsubstituted or substituted by up to two $C_{1-8}$ alkyl radicals, silyl radicals of the formula —Si—$(R^6)_3$ wherein each $R^6$ is selected from the group consisting of hydrogen, $C_{1-8}$ alkyl or alkoxy radical, $C_{6-10}$ aryl or aryloxy radicals and germanyl radicals of the formula —Ge—$(R^7)_3$ wherein each $R^7$ is selected from the group consisting of hydrogen, $C_{1-8}$ alkyl or alkoxy radical, $C_{6-10}$ aryl or aryloxy radical.

Such cyclopentadienyl-type ligand according to the invention is a mono anionic ligand system that is connected to the titanium atom via an aromatic π-electron. In some cases, the monoanionic cyclopentadienyl coordination is described as an $\eta^5$-bond.

In a preferred embodiment the cyclopentadienyl ligand is penta substituted by methyl groups and in consequence Cy is 1,2,3,4,5-pentamethyl-cyclopentadienyl, $C_5Me_5$, commonly referred to as Cp*.

The characteristic of an imine ligand is defined as a group containing a carbon atom double bonded to a nitrogen atom. Non exhaustive examples of imine ligands are ketimine, amidine, phosphinimine, iminoimidazolidine, (hetero)aryloxyimines, pyrroleimines, indoleimines, imidazoleimines or (hetero)aryloxides, (substituted) pyridin-2-yl-methoxy, (substituted) quinolin-2-yl-methoxy, 8-hydroxyquinoline, 8-aminoquinoline, 8-phosphinoquinoline, 8-thioquinoline, 8-hydroxyquinaldine, 8-aminoquinaldine, 8-phosphinoquinaldine, 8-thioquinaldine and 7-azaindole or indazole and the like. A further example of an imine ligand is a guanidine ligand with the specific characteristic of a guanidinate ligands being that a carbon atom double bounded to the nitrogen atom is further connected to two substituents via Group 15 atoms represented by A in the formula above.

The substituents of the guanidinate ligand L, "RR$^1$A" and "R$^2$R$^3$A" may be the same or different without being part of a mutual ring structure.

A preferred embodiment of the invention consist of the catalyst component comprising a compound of formula CyLMD wherein L is (RR$^1$N)(R$^2$R$^3$N)C=N— and R, R$^1$, R$^2$ and R$^3$ are independently selected from the group consisting of hydrogen and hydrocarbyl residue.

Conjugated diene ligands D may be associated with the metal in either an s-trans configuration (π-bound) or in an s-cis configuration (either π-bonded or σ-bonded). In the metal complexes used in the present invention, the diene ligand group, D, is preferably t-bound. Such a bonding type is readily determined by X-ray crystallography or by NMR spectral characterization according to the techniques of Yasuda, et al., Organometallics, 1, 388 (1982), Yasuda, et al., Acc. Chem. Res., 18, 120 (1985), and Erker, et al., Adv. Organomet. Chem., 24, 1 (1985), as well as the references cited therein. By the term "π-complex" is meant both the donation and back acceptance of electron density by the ligand, which is accomplished using ligand orbitals.

A suitable method of determining the existence of a π-complex in diene containing metal complexes is the measurement of metal-carbon atomic spacings for the carbons of the diene using common X-ray crystal analysis techniques. Measurements of atomic spacings between the metal M and C1, C2, C3, C4 (M-C1, M-C2, M-C3, M-C4, respectively) (where C1 and C4 are the terminal carbons of the 4 carbon conjugated diene group and C2 and C3 are the internal carbons of the 4 carbon conjugated diene group) may be made. If the difference between these bond distances, Δd, using the following formula:

$$\Delta d = [(M-C1+M-C4)-(M-C2+M-C3)]/2$$

is greater than or equal to −0.15 Å, the diene is considered to form a π-complex with M. Such a π-bound diene is considered to be a electronically neutral ligand. In consequence the concerned titanium atom of the metal complex is in the formal oxidation state +2.

If Δd is less than −0.15 Å, the diene is considered to form a σ-complex with M and the metal complex can formally be represented by a metallocyclopentene structure with the titanium atom is in the +4 formal oxidation state.

It is to be understood that the complexes according to the present invention may be formed and utilized as a mixture of Δ-bonded diene complexes and σ-bonded diene complexes.

Inasmuch as the complexes can contain at most one cyclopentadienyl type ligand (Cy) it follows that the diene ligand D cannot comprise a cyclopentadienyl group or other anionic, aromatic π-bonded group.

A preferred embodiment of the present invention consists of a catalyst system, wherein the conjugated diene, is a $C_{4-40}$ diene optionally substituted with one or more groups independently selected from the group consisting of hydrocarbyl, silyl, and halogenated carbyl.

Examples of suitable D moieties include: butadiene, isoprene, 1,3-pentadiene, 1,4-diphenyl-1,3-butadiene; 2,3-diphenyl-1,3-butadiene; 3-methyl-1,3-pentadiene; 1,4-dibenzyl-1,3-butadiene; 2,4-hexadiene; 2,4,5,7-tetramethyl-3,5-octadiene; 2,2,7,7-tetramethyl-3,5-octadiene; 1,4-ditolyl-1,3-butadiene; 1,4-bis(trimethylsilyl)-1,3-butadiene; 2,3-dimethylbutadiene.

A consequence of the preferred π-bonding of the coordinating diene is that the titanium atom of the complex of the present invention with the general formula CyLMD, has the formal valence 2+, since both the ligands Cy and L are monoanionic ligands.

A preferred catalyst system according to the invention comprises an activating cocatalyst selected from the group consisting of borate, borane, or alkylaluminoxane.

Aluminoxanes may be used as activator and/or as a catalyst poison scavenger and/or as an alkylating agent. Most often the aluminoxane is a mixture of different organoaluminum compounds.

The aluminoxane may be of the overall formula: $(R^8)_2AlO(R^8AlO)_mAl(R^8)_2$ wherein each $R^8$ is independently selected from the group consisting of $C_{1-20}$ hydrocarbyl radicals and m is from 0 to 50, preferably $R^8$ is a $C_{1-4}$ radical and m is from 5 to 30. Methylaluminoxane (MAO) in which most of the $R^8$ groups in the compounds of the mixture are methyl is the preferred aluminoxane.

Aluminoxanes are readily available articles of commerce generally as a solution in a hydrocarbon solvent.

The aluminoxane, when employed, is preferably added at aluminum to transition metal (in the catalyst) mole ratio of from 10:1 to 5000:1. Preferred ratios are from 20:1 to 1000:1. Most preferred ratios are from 50:1 to 250:1.

Borate activating cocatalysts can be described by boron containing compounds of the formula $[R^9]^+[B(R^{10})_4]^-$ wherein B is a boron atom, $R^9$ is a cyclic $C_{5-7}$ aromatic cation or a triphenyl methyl cation and each $R^{10}$ is independently selected from the group consisting of phenyl radicals which are unsubstituted or substituted with from 1 to 5 substituents selected from the group consisting of a fluorine atom, a $C_{1-4}$ alkyl or alkoxy radical which is unsubstituted or substituted by fluorine atoms; and a silyl radical of the formula —Si—$(R^{12})_3$; wherein each $R^{12}$ is independently selected from the group consisting of a hydrogen atom and a $C_{1-4}$ alkyl radical.

Further borate activating cocatalysts are described by boron containing compounds of the formula $[(R^{11})_tAH]^+[B(R^{10})_4]^-$ wherein B is a boron atom, H is a hydrogen atom, A is a nitrogen atom or phosphorus atom, t is 2 or 3 and $R^{11}$ is selected from the group consisting of $C_{1-8}$ alkyl radicals, a phenyl radical which is unsubstituted or substituted by up to three $C_{1-4}$ alkyl radicals, or one $R^{11}$ taken together with the nitrogen atom may form an anilinium radical and $R^{10}$ is as defined above.

Borane activating cocatalyst are compounds of the general formula $B(R^{10})_3$ wherein $R^{10}$ is as defined above.

A preferred embodiment of the present invention is a catalyst system wherein the activating cocatalyst is a borane represented by the general formula $B(R^{13})_3$, wherein B is a boron atom in the trivalent valence state and each $R^{13}$ is individually selected from the group consisting of halogen atom, hydrocarbyl, halogenated hydrocarbyl, substituted silyl, alkoxy or di substituted amino residue. A most preferred activating cocatalyst is tris pentafluorophenyl borane.

Readily commercially available borate and borane compounds capable of activating the described titanium complexes include: N,N-dimethylanilium-tetrakispentafluorophenyl borate, triphenylmethylium tetrakispentafluorophenyl borate, and trispentafluorophenyl boron.

Above described titanium metal complex and the activating cocatalyst represent the essential compounds required for the highly active polymerization reaction as described by the present invention. It will be understood by the person skilled in the art, that further additives are not excluded from the polymerization process. A non-limiting list of such additives consists of scavengers, stabilizers and carrier materials.

The term scavenger as used in this specification is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when an activator capable of ionizing the titanium metal complex is also present. Aluminum alkyls and aluminoxanes are suitable scavengers. Typical examples are triethylaluminum ($Et_3Al$), trioctylaluminum ($Oct_3Al$), tri-isobutylaluminum (i-$Bu_3Al$), $(Et_2Al)_2O$, $(Oct_2Al)_2O$, (i-$Bu_2Al)_2O$ and oligomers thereof such as $[(Et_2Al)_2O]_n$ $[(Oct_2Al)_2O]_n$ and $[(i-Bu_2Al)_2O]_n$ (with n>1). Optionally the trialkyl aluminium scavengers can be modified by phenolic compounds or other protic heteroatom containing compounds.

An exemplary list of carriers (also called carrier materials or support materials) includes metal oxides (such as silica, alumina, silica-alumina, titania and zirconia); metal chlorides (such as magnesium chloride); clays, polymers or talc.

The preferred support material is silica. In a particularly preferred embodiment, the silica has been treated with an aluminoxane (especially methylaluminoxane or MAO) prior to the deposition of the titanium metal complex. It will be recognized by those skilled in the art that silica may be characterized by such parameters as particle size, pore volume and residual silanol concentration. The pore size and silanol concentration may be altered by heat treatment or calcination. The residual silanol groups provide a potential reaction site between the aluminoxane and the silica. This reaction may help to "anchor" the aluminoxane to the silica.

As a general guideline, the use of commercially available silicas, such as those sold by W.R. Grace under the trademark Davidson 948 or Davidson 955, are suitable.

The invention further relates to a process for the preparation of a polymer comprising at least one aliphatic or aromatic hydrocarbyl $C_{2-20}$ olefin wherein the at least one aliphatic or aromatic olefin is contacted with the catalyst system of the present invention.

In a preferred embodiment the catalyst system comprising an activating cocatalyst which is selected from the group consisting of borate and borane and at least one aluminium alkyl or alkyl aluminoxane or a mixture thereof. Here the aluminium compounds work as scavengers. Even more preferred is such a combination that further comprises phenolic compounds like BHT or other protic heteroatom containing compounds.

Polymerization process according to this invention may be undertaken in any of the well know olefin polymerization processes including those known as "gas phase", "slurry", "high pressure" and "solution".

The use of a supported catalyst is preferred for gas phase and slurry processes whereas a non-supported catalyst is preferred for the solution process.

The polymerization process according to this invention uses an olefin, e.g. ethylene or propylene and may include other monomers which are copolymerizable therewith (such as other olefins, preferably propylene, butene, hexene or octene, and optionally dienes such as hexadiene isomers, vinyl aromatic monomers such as styrene or cyclic olefin monomers such as norbornene).

The polyethylene polymers which may be prepared in accordance with the present invention typically comprise not less than 60, preferably not less than 70 wt % of ethylene and the balance one or more $C_{4-10}$ alpha olefins preferably selected from the group consisting of 1-butene, 1-hexene and 1-octene. The polyethylene prepared in accordance with the present invention may be linear low density polyethylene having density from about 0.910 to 0.935 g/mL. The process of the present invention is preferably used to prepare polyethylene having a density below 0.910 g/mL—the so called very low and ultra low density polyethylenes.

A preferred embodiment of the present invention is a process wherein the prepared polymer is EPDM. EPDM being the common terminology to describe elastomeric co- and terpolymers of ethylene, propylene and optionally one or more diolefin monomer (diene). Generally, such elastomeric polymers will contain about 40 to about 80 wt % ethylene, preferably about 50 to 75 wt % ethylene and correspondingly from 60 to 20 wt % and preferably from 50 to 25 wt % of propylene respectively. A portion of the monomers, typically the propylene monomer, may be replaced by a non-conjugated diolefin. The diolefin may be present in amounts up to 10 wt % of the polymer although typically is present in amounts from about 3 to 5 wt %. The resulting polymer may have a composition comprising from 40 to 80 wt % of ethylene, from 60 to 20 wt % of propylene and up to 10 wt % of one or more diene monomers to provide 100 wt % of the polymer. Preferred but not limiting examples of the dienes are dicyclopentadiene (DCPD), 1,4-hexadiene (HD), 5-methylene-2-norbornene, 5-ethylidene-2-norbornene (ENB) and 5-vinyl-2-norbornene (VNB). Particularly preferred dienes are ENB and VNB.

The polymers prepared according to the process of the present invention may have a weight average molecular weight of 10,000 to 5,000,000 g/mol. Preferably, the polymers have a weight average molecular weight of 20,000 to 1,000,000 g/mol, more preferably 50,000 to 300,000 g/mol.

The preferred polymerization process of this invention encompasses the use of the novel catalysts system in a medium pressure solution process. As used herein, the term "medium pressure solution process" refers to a polymerization carried out in a solvent for the polymer at an operating temperature from 20 to 150° C. (especially from 40 to 120° C.) and a total pressure of from 3 to 35 bar. Hydrogen may be used in this process to control molecular weight. Optimal catalyst component concentrations are affected by such variables as temperature and monomer concentration but may be quickly optimized by non-inventive tests.

The most preferred process of the present invention is a solution process for the polymerization of ethylene propylene diene elastomers (EPDM). The solution polymerization process, in particular for EPDM is preferably conducted in the presence of an inert hydrocarbon solvent such as a $C_{5-12}$ hydrocarbon which may be unsubstituted or substituted by a $C_{1-4}$ alkyl group such as pentane, methyl pentane, hexane, heptane, octane, cyclohexane, methylcyclohexane, pentamethyl heptanes and hydrogenated naphtha.

The monomers used in the process according to the invention for the preparation of the polymer may be dissolved/dispersed in the solvent prior to being fed to a reactor. For a gaseous monomer, the monomer may be fed to a reactor so that it will dissolve in the reaction mixture. Prior to mixing, the solvent and monomers are preferably purified to remove potential catalyst poisons such as water or oxygen. The feedstock purification follows standard practices in the art, e.g. molecular sieves, alumina beds and oxygen removal catalysts are used for the purification of monomers. The solvent itself (e.g. methylpentane, cyclohexane, hexane or toluene) is preferably treated in a similar manner.

The feedstock may be heated or cooled prior to feeding to the polymerization reactor. Additional monomers and solvent may be added to a second reactor and the reactor(s) may be heated or cooled.

Generally, the catalyst component and ingredients such as scavenger and activator can be added as separate solutions to the reactor or premixed before adding to the reactor.

The residence time in the polymerization reactor will depend on the design and the capacity of the reactor. Generally the reactors should be operated under conditions to achieve a thorough mixing of the reactants. If two reactors in series are used, it is preferred that from 50 to 95 wt % of the final polymer is polymerized in the first reactor, with the balance being polymerized in the second reactor. It is also possible to use a dual parallel reactor setup. On leaving the reactor the solvent is removed and the resulting polymer is finished in a conventional manner.

It is also within the scope of this invention to use more than two polymerization reactors.

The invention also relates to the polymer obtainable by the process according to the invention.

A further advantage of the polymerization system according to the present invention is the speed of activation of the titanium diene complex upon the addition of the activating cocatalyst. Whereas most of the catalyst systems from the prior art require pre-mixing of the catalyst-cocatalyst system, the catalyst system of the present invention allows the immediate dosing of the titanium complex and the cocatalyst to the reactor without substantial loss of activity of the catalyst system.

EXAMPLES

Example 1

In an inert atmosphere of nitrogen, the reactor was filled with 650 mL of PMH (pentamethyl heptanes), 450 μmol methyl aluminoxane (MAO-10T of Crompton-Witco) and 900 μmol 2,6-di-tertiary-butyl-4-methylphenol (BHT). The catalyst vessel was rinsed with an additional 50 ml of PMH, which was added to the reactor.

The reactor was heated to 100° C., while stirring at 1000 rpm. The reactor was pressurized to 8 bar and continuously fed (500 mL/h) with ethylene. The reactor was kept constant at 8 bar by venting of the gas phase.

After stirring the solution for ten minutes at a constant pressure and temperature (conditioning period), 0.1 μmol catalyst (Cp*[Me$_2$N(C=N)NMe$_2$]Ti[1,4-Me$_2$(C$_4$H$_4$)]) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 30 min at 140° C. to rinse the reactor of any residual polymer. The polymer solution was stabilized with Irganox 1076 (99 mg) in isopropanol/PMH and dried overnight at 93° C. under reduced pressure.

Polymer Yield: 3.0 g. Calculated titanium content: 1.6 ppm

Example 2

In an inert atmosphere of nitrogen, the reactor was filled with 650 mL of pentamethyl heptanes (PMH), 450 μmol iso-butyl aluminoxane (iBAO-65 of AkzoNobel). The catalyst vessel was rinsed with an additional 50 ml of PMH, which was added to the reactor.

The reactor was heated to 100° C., while stirring at 1000 rpm. The reactor was pressurized to 8 bar and continuously fed (500 nL/h) with ethylene. The reactor was kept constant at 8 bar by venting of the gas phase.

After stirring the solution for ten minutes at a constant pressure and temperature (conditioning period), 0.1 μmol catalyst (Cp*[Me$_2$N(C=N)NMe$_2$]Ti[1,4-Me$_2$(C$_4$H$_4$)]) was added via the catalyst vessel into the reactor. Then 0.2 μmol co catalyst tris(perfluorophenyl)borane (BF$_{15}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 30 min at 140° C. to rinse the reactor of any residual polymer. The polymer solution was stabilized with Irganox 1076 (99 mg) in isopropanol/PMH and dried overnight at 93° C. under reduced pressure.

Polymer Yield: 0.5 g. Calculated titanium content: 9.2 ppm

Example 3

In an inert atmosphere of nitrogen, the reactor was filled with 650 mL of pentamethyl heptanes (PMH), 450 μmol iso-butyl aluminoxane (iBAO-65 of AkzoNobel). The catalyst vessel was rinsed with an additional 50 ml of PMH, which was added to the reactor.

The reactor was heated to 100° C., while stirring at 1000 rpm. The reactor was pressurized to 8 bar and continuously fed (500 nL/h) with ethylene. The reactor was kept constant at 8 bar by venting of the gas phase.

After stirring the solution for ten minutes at a constant pressure and temperature (conditioning period), 0.1 μmol catalyst (Cp*[Me$_2$N(C=N)NMe$_2$]Ti[1,4-Me$_2$(C$_4$H$_4$)]) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 30 min at 140° C. to rinse the reactor of any residual polymer. The polymer solution was stabilized with Irganox 1076 (99 mg) in isopropanol/PMH and dried overnight at 93° C. under reduced pressure.

Polymer Yield: 0.6 g. Calculated titanium content: 8.7 ppm

Examples 4

In an inert atmosphere of nitrogen, the reactor was filled with 650 mL of pentamethyl heptanes (PMH), 450 μmol iso-butyl aluminoxane (iBAO-65 of AkzoNobel). The catalyst vessel was rinsed with an additional 50 ml of PMH, which was added to the reactor.

The reactor was heated to 100° C., while stirring at 1000 rpm. The reactor was pressurized to 8 bar and continuously fed (500 nL/h) with ethylene. The reactor was kept constant at 8 bar by venting of the gas phase.

After stirring the solution for ten minutes at a constant pressure and temperature (conditioning period), 0.3 μmol catalyst (Cp*[Me$_2$N(C=N)NMe$_2$]Ti[1,4-Me$_2$(C$_4$H$_4$)]) was added via the catalyst vessel into the reactor. Then 0.6 μmol co catalyst tris(perfluorophenyl)borane (BF$_{15}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 30 min at 140° C. to rinse the reactor of any residual polymer. The polymer solution was stabilized with Irganox 1076 (99 mg) in isopropanol/PMH and dried overnight at 93° C. under reduced pressure.

Polymer Yield: 1.8 g. Calculated titanium content: 8.0 ppm

Example 5

In an inert atmosphere of nitrogen, the reactor was filled with 650 mL of PMH (pentamethyl heptanes), 450 µmol methyl aluminoxane (MAO-10T of Crompton-Witco) and 900 µmol 2,6-di-tertiary-butyl-4-methylphenol (BHT). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 mL/h and 400 nL/h). The reactor was kept constant at 8 bar by venting of the gas phase.

After stirring the solution for ten minutes at a constant pressure and temperature (conditioning period), 0.5 µmol catalyst ($Cp^*[Me_2N(C\!=\!\!=\!\!N)NMe_2]Ti[1,4-Me_2(C_4H_4)]$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer yield: 7.8 g. Calculated titanium content: 3.1 ppm

Example 6

In an inert atmosphere of nitrogen, the reactor was filled with 650 mL of pentamethyl heptanes (PMH), 450 µmol iso-butyl aluminoxane (iBAO-65 of AkzoNobel). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 nL/h and 400 nL/h). The reactor was kept constant at 8 bar by venting of the gas phase.

After stirring the solution for ten minutes at a constant pressure and temperature (conditioning period), 0.5 µmol catalyst ($Cp^*[Me_2N(C\!=\!\!=\!\!N)NMe_2]Ti[1,4-Me_2(C_4H_4)]$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer yield: 0.7 g. Calculated titanium content: 36.3 ppm

Example 7

In an inert atmosphere of nitrogen, the reactor was filled with 650 mL of pentamethyl heptanes (PMH), 450 µmol iso-butyl aluminoxane (iBAO-65 of AkzoNobel). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 nL/h and 400 nL/h). The reactor was kept constant at 8 bar by venting of the gas phase.

After stirring the solution for ten minutes at a constant pressure and temperature (conditioning period), 0.5 µmol catalyst ($Cp^*[Me_2N(C\!=\!\!=\!\!N)NMe_2]Ti[1,4-Me_2(C_4H_4)]$) was added via the catalyst vessel into the reactor. Then 0.5 µmol co catalyst tris(perfluorophenyl)borane ($BF_{15}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer Yield: 1.9 g. Calculated titanium content: 12.4 ppm

Example 8

In an inert atmosphere of nitrogen, the reactor was filled with 650 mL of pentamethyl heptanes (PMH), 450 µmol iso-butyl aluminoxane (iBAO-65 of AkzoNobel). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 nL/h and 400 nL/h). The reactor was kept constant at 8 bar by venting of the gas phase.

After stirring the solution for ten minutes at a constant pressure and temperature (conditioning period), 0.5 µmol catalyst ($Cp^*[Me_2N(C\!=\!\!=\!\!N)NMe_2]Ti[1,4-Me_2(C_4H_4)]$) was added via the catalyst vessel into the reactor. Then 1.0 µmol co catalyst tris(perfluorophenyl)borane ($BF_{15}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer Yield: 1.8 g. Calculated Titanium content: 13.0 ppm

Example 9

In an inert atmosphere of nitrogen, the reactor was filled with 650 mL of pentamethyl heptanes (PMH), 450 µmol iso-butyl aluminoxane (iBAO-65 of AkzoNobel). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 nL/h and 400 nL/h). The reactor was kept constant at 8 bar by venting of the gas phase.

After stirring the solution for ten minutes at a constant pressure and temperature (conditioning period), 0.5 μmol catalyst (Cp*[Me$_2$N(C=N)NMe$_2$]Ti[1,4-Me$_2$(C$_4$H$_4$)]) was added via the catalyst vessel into the reactor. Then 1.0 μmol co catalyst trityl tetrakis(perfluorophenyl)borate (TBF$_{20}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer Yield: 1.3 g. Calculated Titanium content: 18.0 ppm

Example 10

In an inert atmosphere of nitrogen, the reactor was filled with 650 mL of pentamethyl heptanes (PMH), 450 μmol iso-butyl aluminoxane (iBAO-65 of AkzoNobel). The catalyst vessel was rinsed with an additional 50 ml of PMH, which was added to the reactor.

The reactor was heated to 90° C., while stirring at 1000 rpm. The reactor was pressurized to 8 bar and continuously fed with under a set ratio of ethylene and propylene (resp. 200 nL/h and 400 nL/h). The reactor was kept constant at 8 bar by venting of the gas phase.

After stirring the solution for ten minutes at a constant pressure and temperature (conditioning period), 0.5 μmol catalyst (Cp*[Me$_2$N(C=N)NMe$_2$]Ti[1,4-Me$_2$(C$_4$H$_4$)]) was added via the catalyst vessel into the reactor. Then 5.0 μmol co catalyst tris(perfluorophenyl)borane (BF$_{15}$) was added via the catalyst vessel into the reactor. The catalyst vessel was rinsed with an additional 50 ml of PMH, which was added to the reactor. The reaction started and the reactor temperature was recorded.

After ten minutes of polymerization, the ethylene flow was stopped and the solution was carefully tapped off. The reactor was flushed for 10 min at 90° C. to rinse the reactor of any residual polymer. The polymer solution was stabilized with Irganox 1076 (99 mg) in isopropanol/PMH and dried overnight at 93° C. under reduced pressure.

Polymer Yield: 2.4 g. Calculated Titanium content: 10.1 ppm.

The invention claimed is:

1. A catalyst system for the polymerization of olefins, the catalyst system comprising:
   (a) a metal complex of formula CyLMD, wherein
      M is titanium,
      D is a conjugated diene,
      L is a guanidinate ligand of the formula

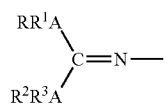

wherein each A is independently selected from nitrogen or phosphorous, and R, R$^1$, R$^2$ and R$^3$ are independently selected from the group consisting of hydrogen, hydrocarbyl, silyl, and germyl residues, optionally substituted with one or more halogen, amido, phosphide, alkoxy, or aryloxy radicals, and
   Cy is a mono- or polysubstituted cyclopentadienyl-type ligand having one or more substituents selected from the group consisting of halogen, hydrocarbyl, silyl, and germyl residues, optionally substituted with one or more halogen, amido, phosphide, alkoxy, or aryloxy residues, and
   (b) an activating cocatalyst.

2. The catalyst system according to claim 1, wherein the diem is a C$_{4-40}$ diene optionally substituted with one or more groups independently selected from the group consisting of hydrocarbyl, silyl, and halogenated carbyl.

3. The catalyst system according to claim 1, wherein the activating cocatalyst is selected from the group consisting of borate, borane, and alkylaluminoxane.

4. The catalyst system according to claim 1, wherein the activating cocatalyst is:
   a borane represented by the general formula B(R$^{13}$)$_3$, wherein B is a boron atom in the trivalent valence state, and each R$^{13}$ is individually selected from the group consisting of halogen atom, hydrocarbyl, halogenated hydrocarbyl, substituted silyl, alkoxy, and di-substituted amino residue; or
   a borate containing compound of the formula [R$^9$]$^+$[B (R$^{10}$)$_4$] wherein B is a boron atom, R$^9$ is a cyclic C aromatic cation or a triphenyl methyl cation, and each R$^{10}$ is independently selected from the group consisting of:
      phenyl radicals which are unsubstituted or substituted with from 1 to 5 substituents selected from the group consisting of a fluorine atom, a C$_{1-4}$ alkyl, and an alkoxy radical which is unsubstituted or substituted by fluorine atoms, and
      a silyl radical of the formula —Si—(R$^{12}$)$_3$, wherein each R$^{12}$ is independently selected from the group consisting of a hydrogen atom and a C$_{1-4}$ alkyl radical.

5. The catalyst system according to claim 1, wherein the activating cocatalyst is:
   a borane represented by the general formula B(R$^{13}$)$_3$, wherein B is a boron atom in the trivalent valence state, and each R$^{13}$ is individually selected from the group consisting of halogen atom, hydrocarbyl, halogenated hydrocarbyl, substituted silyl, alkoxy, and di-substituted amino residue; or
   a borate containing compound of the formula [R$^9$]$^+$[B(R$^{10}$)$_4$] wherein B is a boron atom, R$^9$ is a cyclic C$_{5-7}$ aromatic cation or a triphenyl methyl cation, and each R$^{10}$ is independently selected from the group consisting of:
      phenyl radicals which are unsubstituted or substituted with from 1 to 5 substituents selected from the group consisting of a fluorine atom, a C$_{1-4}$ alkyl or alkoxy radical which is unsubstituted or substituted by fluorine atoms, and
      a silyl radical of the formula —Si—(R$^{12}$)$_3$, wherein each R$^{12}$ is independently selected from the group consisting of a hydrogen atom and a C$_{1-4}$ alkyl radical, and
   the activating cocatalyst comprises at least one aluminium alkyl or alkyl aluminoxane or a mixture thereof.

6. A process for the preparation of a polymer comprising at least one aliphatic or aromatic hydrocarbyl C$_{2-20}$ olefin, the process comprising contacting the at least one aliphatic or aromatic olefin with the catalyst system according to any of the claims 1 to 5.

7. The process according to claim 6, wherein the polymer is EPDM.

8. The catalyst system according to claim 2, wherein the activating cocatalyst is selected from the group consisting of borate, borane, and alkylaluminoxane.

9. The catalyst system according to claim 1, wherein the conjugated diene D is selected from the group consisting of butadiene, isoprene, 1,3-pentadiene, 1,4-diphenyl-1,3-butadiene, 2,3-diphenyl-1,3-butadiene, 3-methyl-1,3-pentadiene; 1,4-dibenzyl-1,3-butadiene, 2,4-hexadiene, 2,4,5,7-tetramethyl-3,5-octadiene, 2,2,7,7-tetramethyl-3,5-octadiene, 1,4-ditolyl-1,3-butadiene, 1,4-bis(trimethylsilyl)-1,3-butadiene, and 2,3-dimethylbutadiene.

10. The catalyst system according to claim 9, wherein the activating cocatalyst is:
- a borane represented by the general formula $B(R^{13})_3$, wherein B is a boron atom in the trivalent valence state, and each $R^{13}$ is individually selected from the group consisting of halogen atom, hydrocarbyl, halogenated hydrocarbyl, substituted silyl, alkoxy, and di-substituted amino residue; or
- a borate containing compound of the formula $[R^9]^+[B(R^{10})_4]$ wherein B is a boron atom, $R^9$ is a cyclic $C_{5-7}$ aromatic cation or a triphenyl methyl cation, and each $R^{10}$ is independently selected from the group consisting of:
  phenyl radicals which are unsubstituted or substituted with from 1 to 5 substituents selected from the group consisting of a fluorine atom, a $C_{1-4}$ alkyl or alkoxy radical which is unsubstituted or substituted by fluorine atoms, and
  a sill radical of the formula $-Si-(R^{12})_3$, wherein each $R^{12}$ is independently selected from the group consisting of a hydrogen atom and a $C_{1-4}$ alkyl radical, and
the activating cocatalyst comprises at least one aluminium alkyl or alkyl aluminoxane or a mixture thereof.

11. The catalyst system according to claim 10, wherein:
Cy is 1,2,3,4,5-pentamethyl-cyclopentadienyl;
each A is nitrogen; and
R, $R^1$, $R^2$ and $R^3$ are independently selected from the group consisting of hydrogen and hydrocarbyl residue.

12. The catalyst system according to claim 11, further including at least one of:
scavengers selected from the group consisting of triethylaluminum, trioctylaluminum, triisobutylaluminum, $(Et_2Al)_2O$, $(Oct_2Al)_2O$, $(i-Bu_2Al)_2O$, and oligomers thereof;
stabilizers; and
carrier materials selected from the group consisting of metal oxides, metal chlorides, clays, polymers, and talc.

* * * * *